(12) United States Patent
Larson

(10) Patent No.: US 6,604,824 B2
(45) Date of Patent: Aug. 12, 2003

(54) POLARIZED LENS WITH OXIDE ADDITIVE

(76) Inventor: Charles P. Larson, 11132 Begonia Ave., Fountain Valley, CA (US) 92708

( * ) Notice: Subject to any disclaimer, the term of this patent is extended or adjusted under 35 U.S.C. 154(b) by 46 days.

(21) Appl. No.: 10/005,679

(22) Filed: Dec. 3, 2001

(65) Prior Publication Data

US 2002/0126256 A1 Sep. 12, 2002

Related U.S. Application Data

(63) Continuation-in-part of application No. 09/255,093, filed on Feb. 22, 1999, now Pat. No. 6,334,680.
(60) Provisional application No. 60/075,577, filed on Feb. 23, 1998.

(51) Int. Cl.$^7$ .............................. G02C 7/02; G02C 7/10
(52) U.S. Cl. ........................ 351/159; 351/41; 351/163
(58) Field of Search ...................... 351/159, 41, 44–46, 351/49, 160 R, 160 H, 163–166; 623/6.11, 6.17, 6.56, 6.62

(56) References Cited

U.S. PATENT DOCUMENTS

| | | | |
|---|---|---|---|
| 3,617,114 A | 11/1971 | Rogers | 351/49 |
| 3,649,696 A | 3/1972 | Kazan, Jr. | 568/333 |
| 4,160,584 A | 7/1979 | Giles | 351/49 |
| 4,240,836 A | 12/1980 | Borelli et al. | 501/13 |
| 4,311,368 A | 1/1982 | Saito et al. | 351/165 |
| 4,315,186 A | 2/1982 | Hirano et al. | 313/111 |
| 4,320,940 A | 3/1982 | Mueller et al. | 351/44 |
| 4,521,524 A | 6/1985 | Yamashita | 501/64 |
| 4,838,673 A | 6/1989 | Richards et al. | 351/44 |
| RE33,729 E | 10/1991 | Perilloux | 359/359 |
| 5,061,659 A | 10/1991 | Ciolek et al. | 501/64 |
| 5,077,240 A | 12/1991 | Hayden et al. | 501/67 |
| 5,135,298 A | 8/1992 | Feltman | 351/163 |
| 5,149,181 A | 9/1992 | Bedford | 351/166 |
| 5,149,183 A | 9/1992 | Perrott et al. | 359/885 |
| 5,177,509 A | 1/1993 | Johansen et al. | 351/44 |
| 5,190,896 A | 3/1993 | Pucilowski et al. | 501/64 |
| 5,245,470 A | 9/1993 | Keum | 359/485 |
| 5,327,180 A | 7/1994 | Hester, III et al. | 351/165 |
| 5,548,491 A | 8/1996 | Karpen | 362/510 |
| 5,729,323 A * | 3/1998 | Arden et al. | 351/163 |
| 5,792,822 A | 8/1998 | Miyabayashi et al. | 526/240 |
| 5,922,246 A | 7/1999 | Matsushita et al. | 252/582 |
| 5,949,518 A | 9/1999 | Belmares et al. | 351/166 |
| 5,973,865 A | 10/1999 | Havens et al. | 351/163 |
| 6,145,984 A | 11/2000 | Farwig | 351/49 |
| 6,450,652 B1 * | 9/2002 | Karpen | 359/603 |

OTHER PUBLICATIONS

Coblentz et al., "Spectral–Transmissive Properties and Use of Colored Eye–Protective Glasses" (1938), pp. 1–26.

Schott Products & Applications, Contrast Enhancement Filter—S8801 for Display Applications (3 pages) Copyright 1999–2000.

Schott Products & Applications, Contrast Enhancement Filter—S8802 for Display Applications (3 pages) Copyright 1999–2000.

Schott Products & Applications, Contrast Enhancement Filter—S8806A for Display Applications (3 pages) Copyright 1999–2000.

(List continued on next page.)

*Primary Examiner*—Jordan M. Schwartz
(74) *Attorney, Agent, or Firm*—Howrey Simon Arnold & White, LLP

(57) ABSTRACT

A lens for reducing glare and improving color discrimination includes a lens wafer containing a rare earth oxide such as neodymium that provides progressively higher transmittance at 540 nm than at 500 nm and at 450 nm, and average transmittance at 540 and 610 nm that is greater than the transmittance at 580 nm. A ultra-violet absorber, a polarized filter and anti-reflective layer may be included to reduce UV light, glare and improve contrast and vision.

20 Claims, 20 Drawing Sheets

OTHER PUBLICATIONS

Schott Products & Applications, Contrast Enhancement Filter—S8807 for Display Applications (3 pages) Copyright 1999–2000.

Schott Products & Applications, Contrast Enhancement Filter—S8808 for Display Applications (3 pages) Copyright 1999–2000.

Schott Products & Applications, Contrast Enhancement Filter—S8809 for Display Applications (3 pages) Copyright 1999–2000.

Schott Products & Applications, Ophthalmic Glass Contrast Enhancement Glass, Major Blanks, S–4315 UV–SG Gray, S–5321 UV–SG Brown. And S–8807 Ace, Amethyst Contrast Enhancers. (2 pages) Copyright 1999–2000.

Schott Products & Applications, Rare Earth Doped Filter Glass (5 pages) Copyright 1999–2000.

Thornton "Luminosity and Color–Rendering Capability of White Light" *Journal of the Optical Society of America* vol. 61, No. 9 (Sept. 1971), pp. 1155–1163.

Thornton "Three–Color Visual Response" *Journal of the Optical Society of America* vol. 62, No. 3 (Mar. 1972), pp. 457–459.

Vibrant Optics—Unique Color–Enhancing Polarized Sunglasses, Copyright 1996 (4 pages).

* cited by examiner

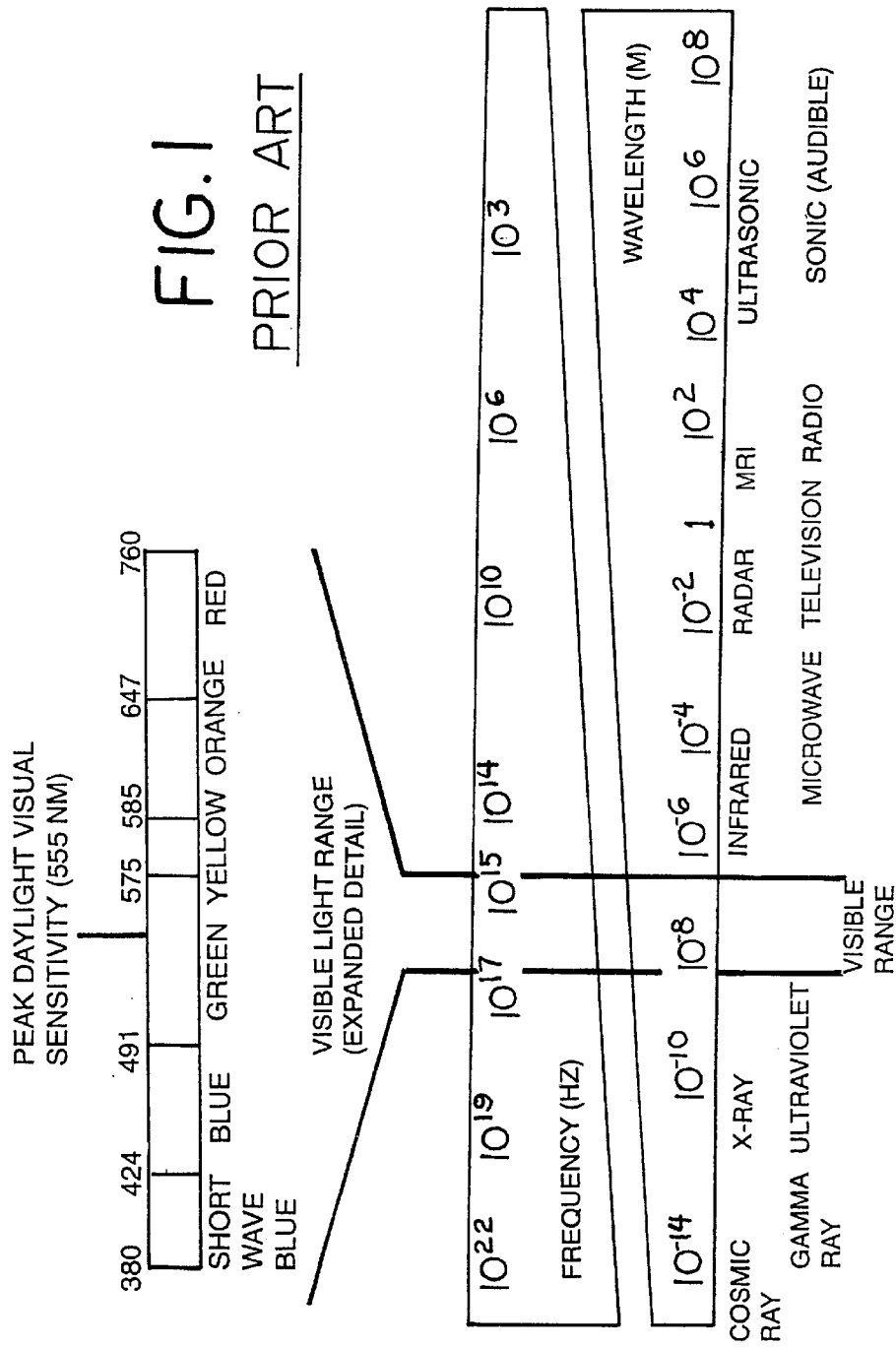

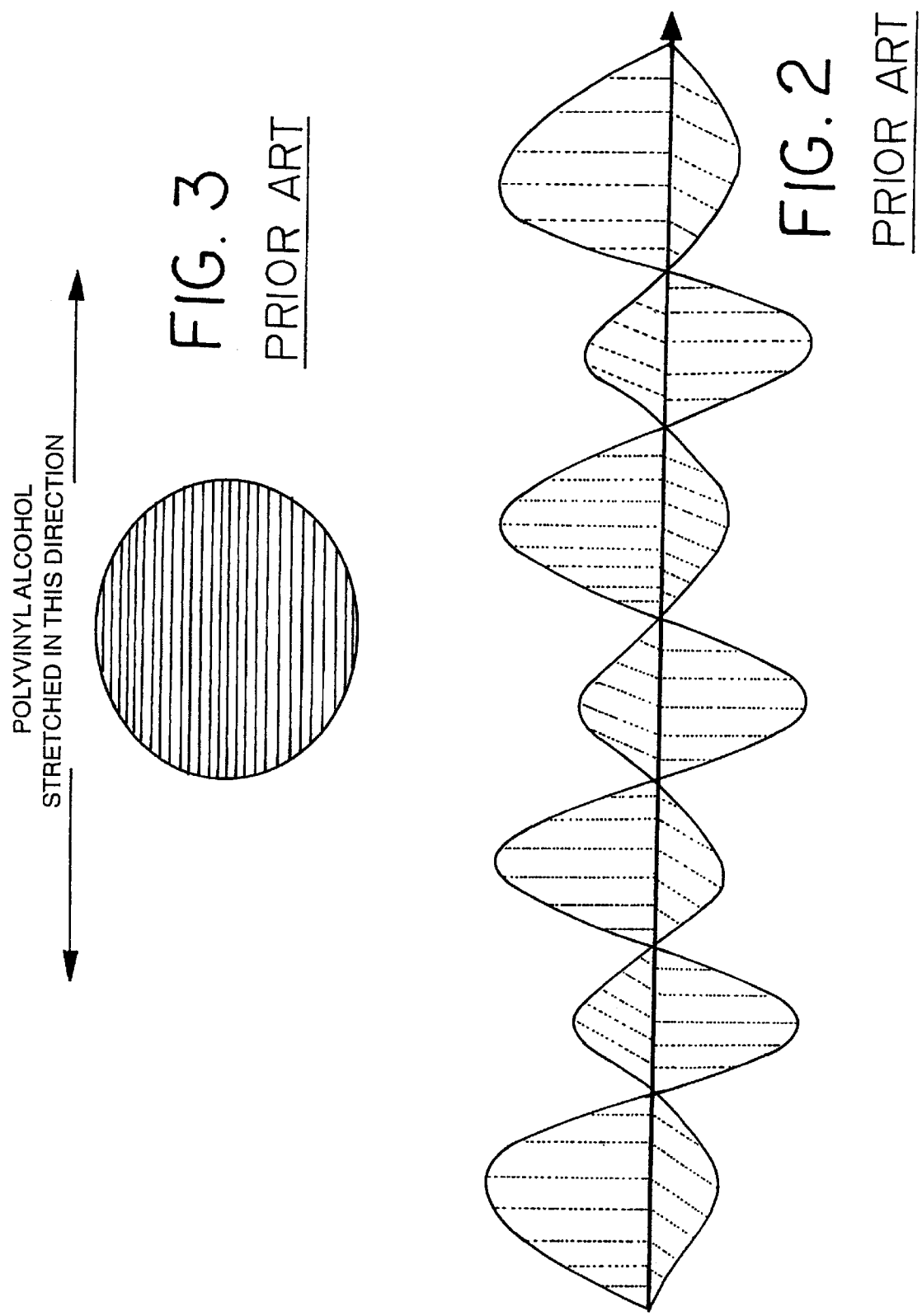

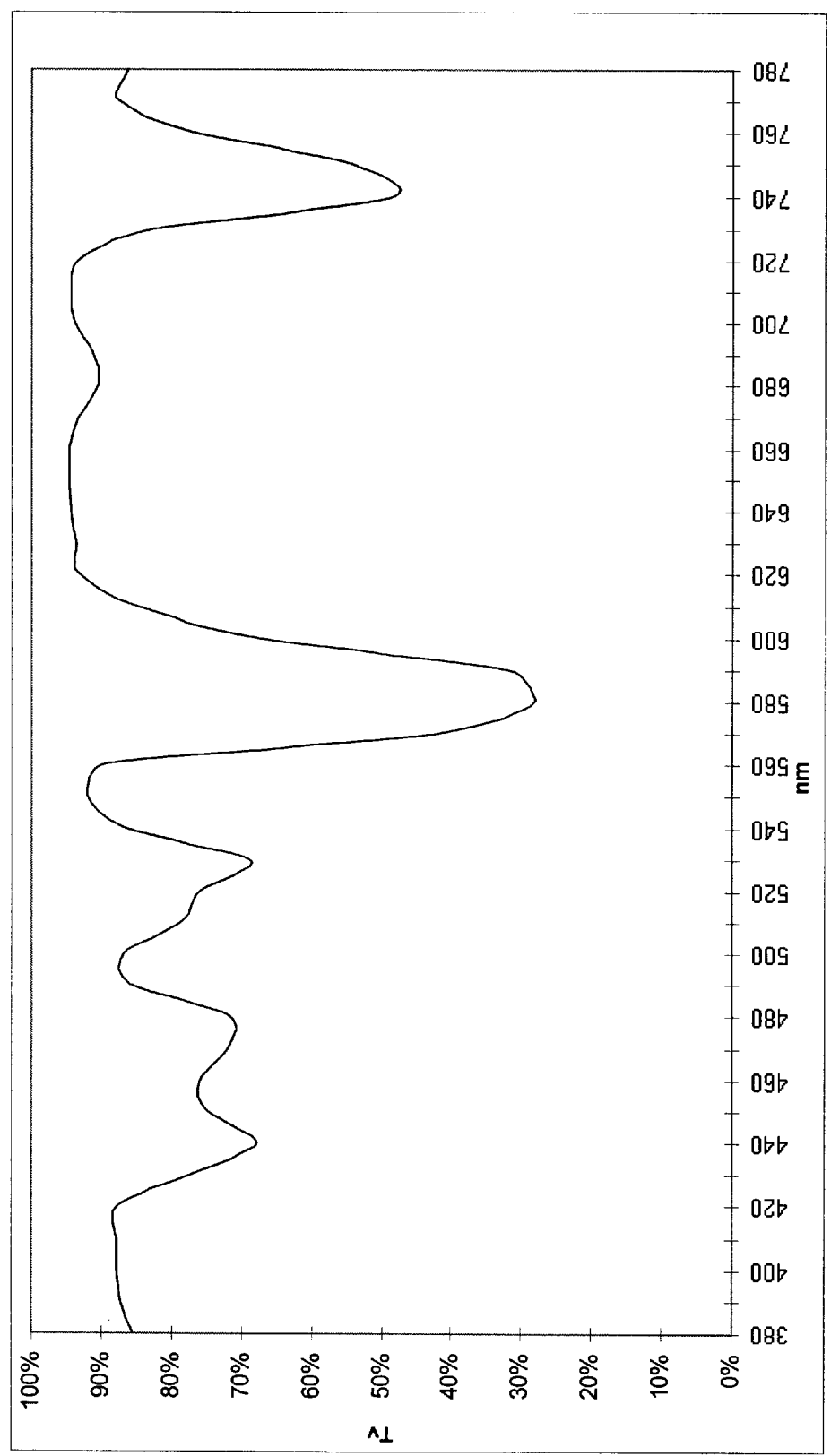
Fig. 14 Neodymium Oxide First Glass Wafer

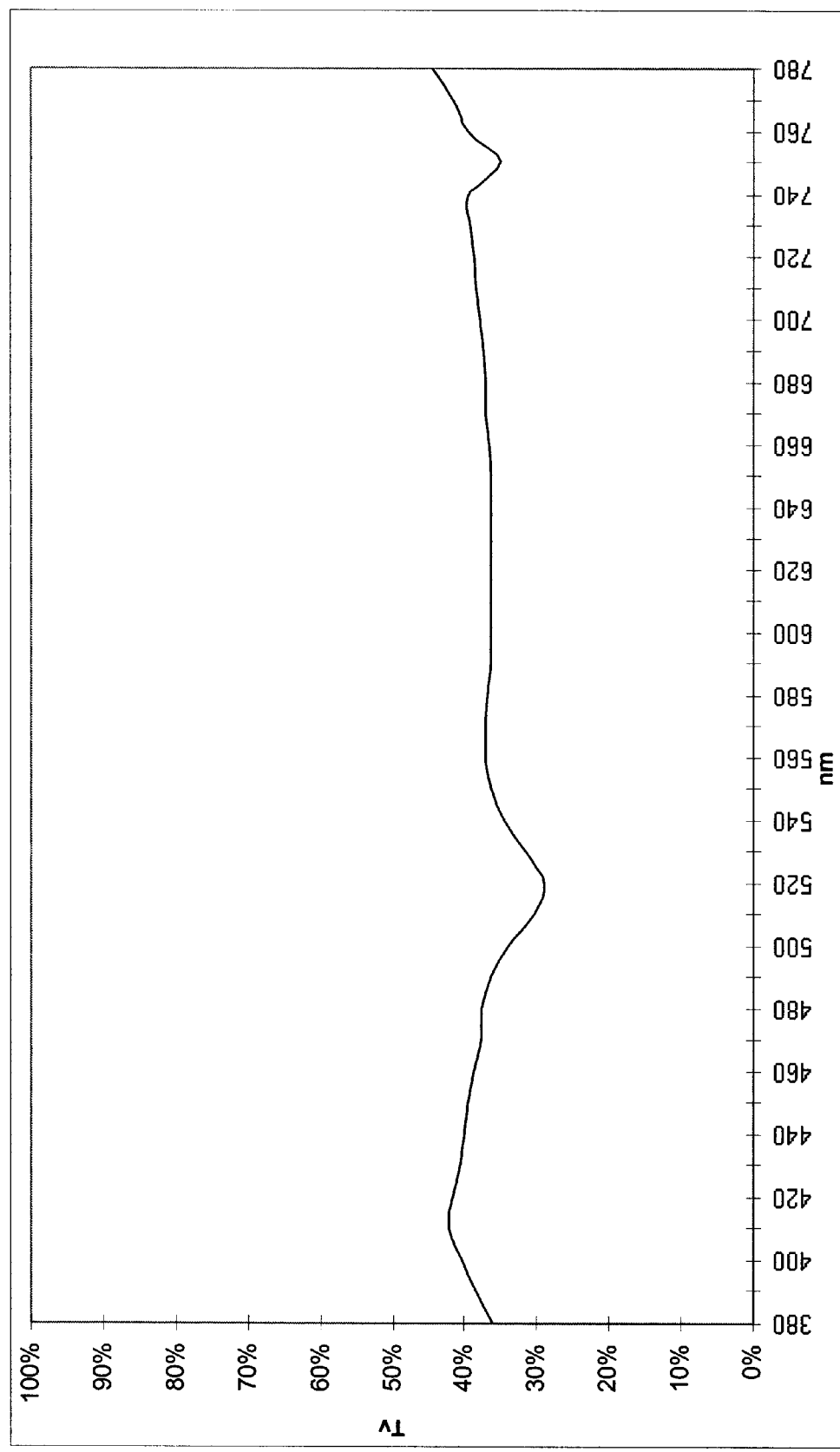
Fig. 15. Gray Film

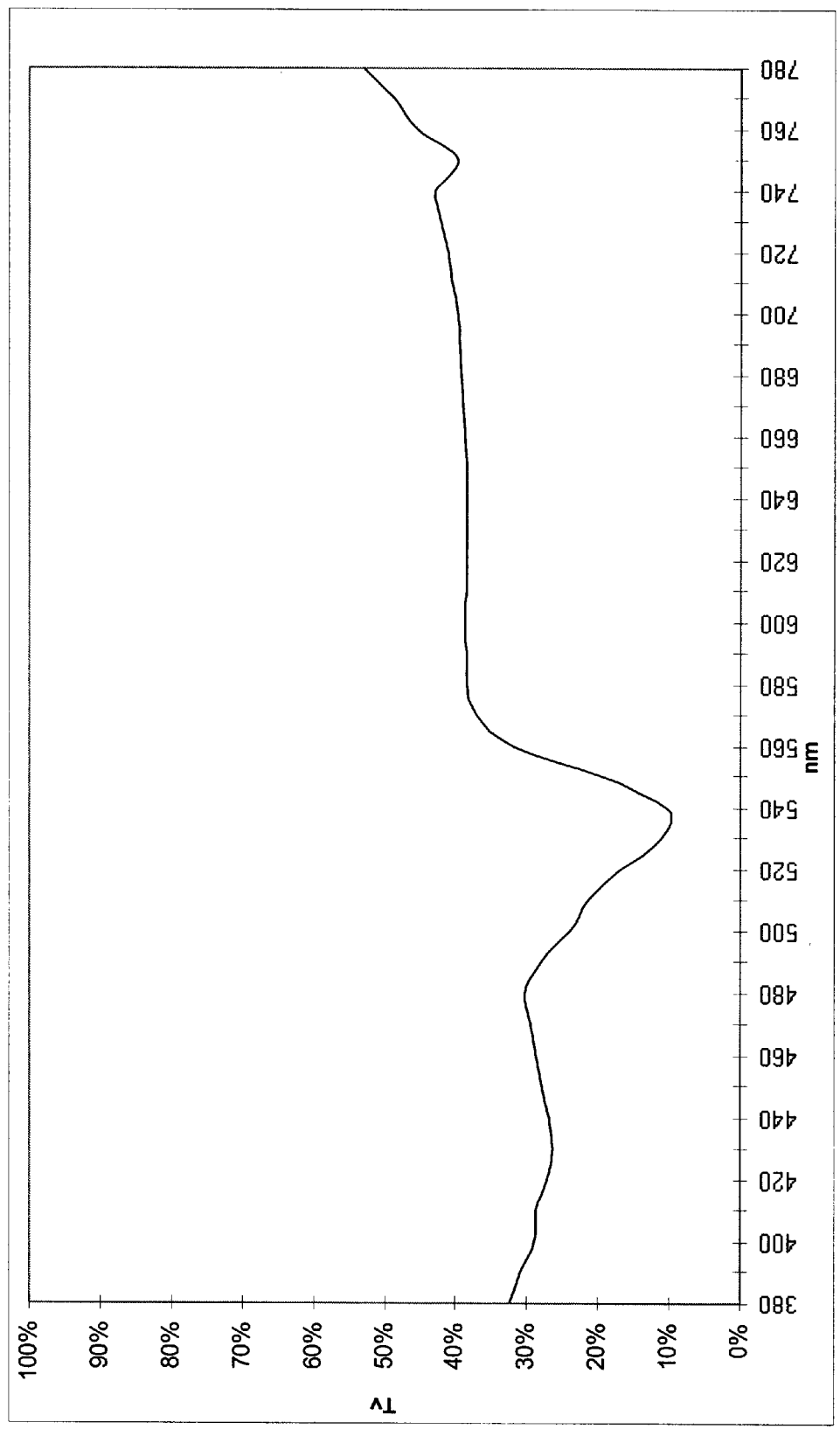
Fig. 16 Copper Film

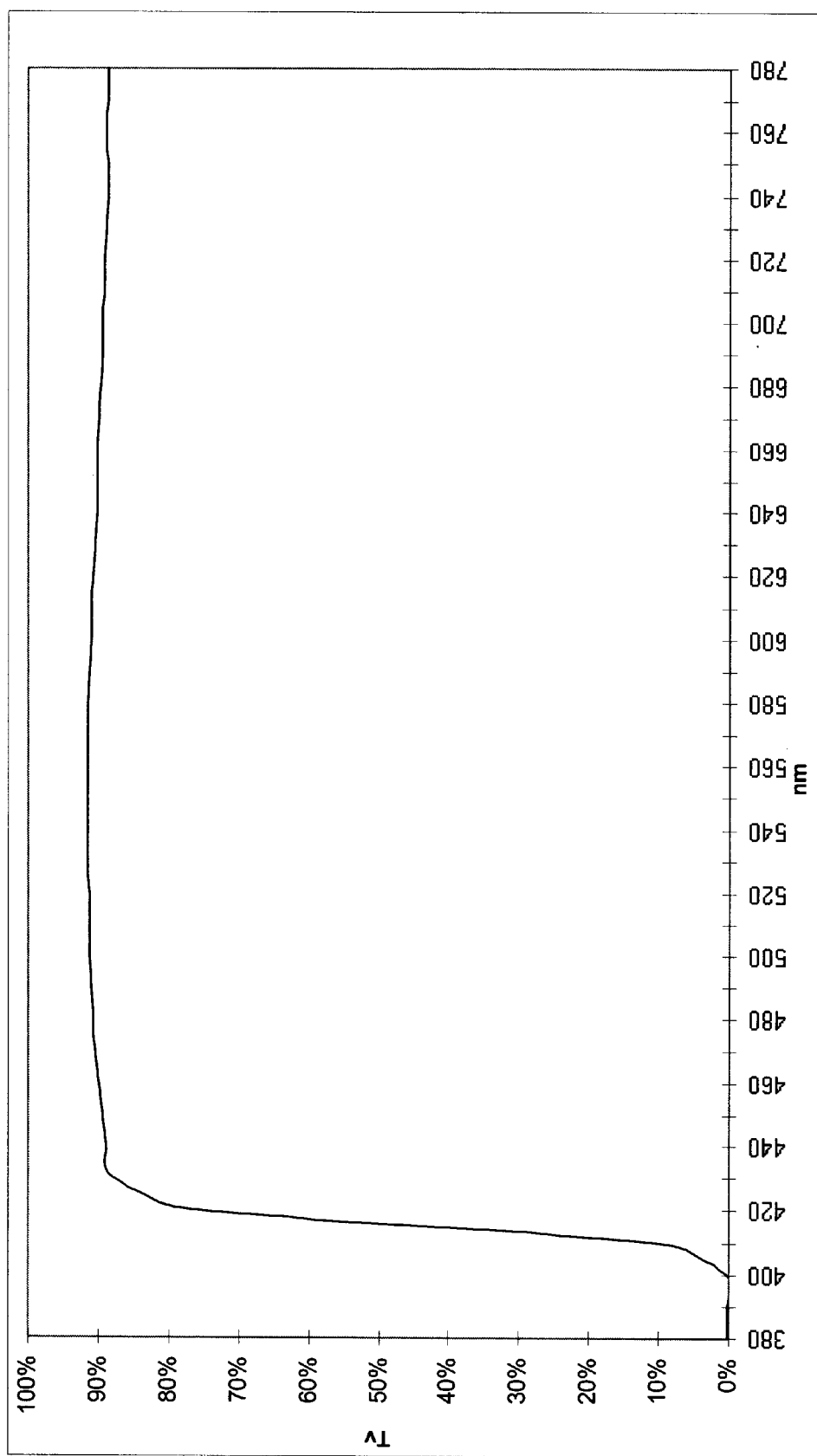
Fig. 17 Second Wafer with UV Absorber

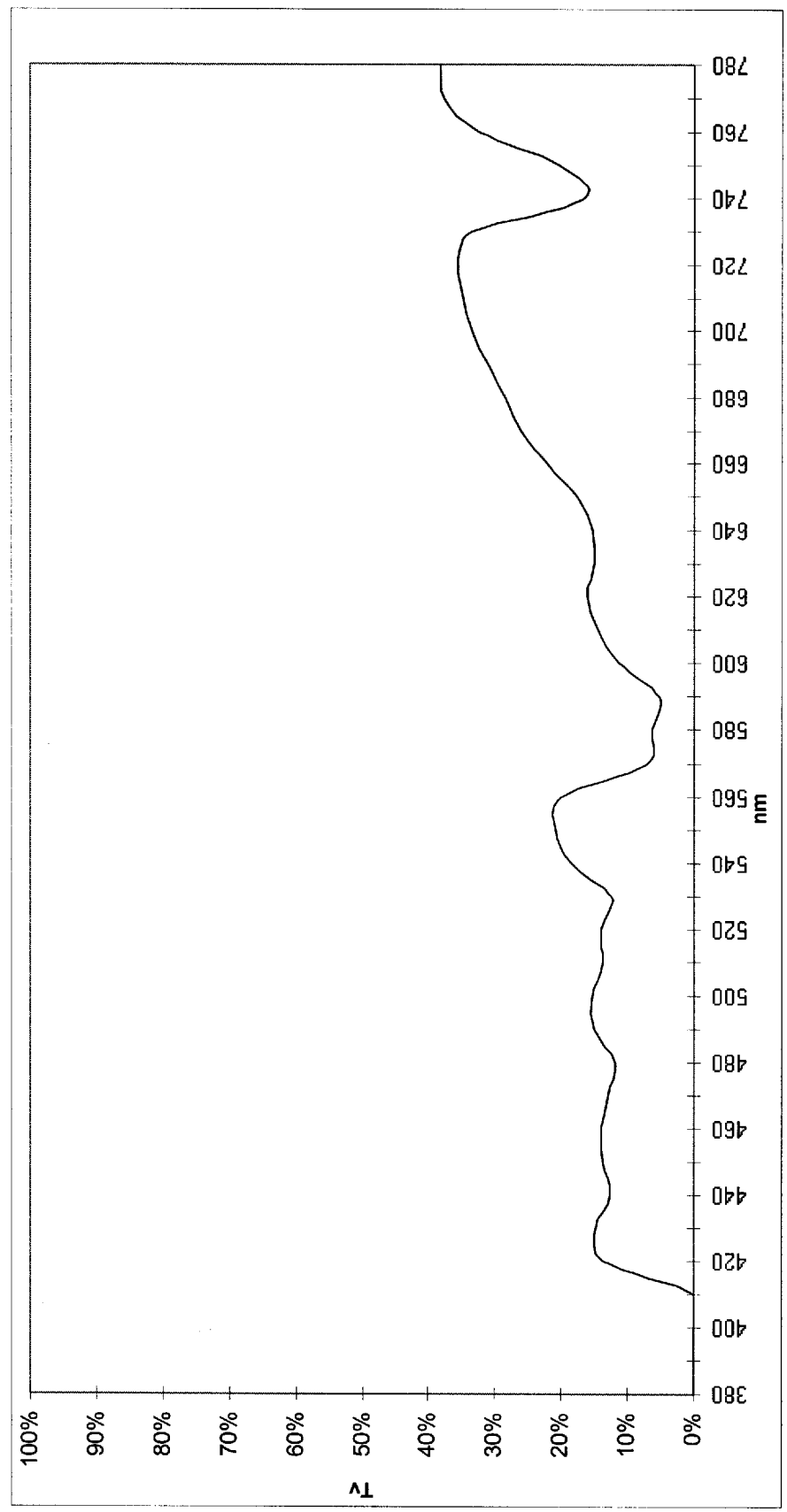
Fig. 18 Gray Lens

Fig. 19 Gray Lens Color and UV Performance

| Standard | ANSI Z80.3:1996 | | | | EN 1836:1997 | | |
|---|---|---|---|---|---|---|---|
| Primary function: | General Purpose | | | Filter category: | 3 (Dark tint) | | |
| | Standard | Reading | | | Standard | Reading | Result |
| Luminous (Tv/C) | | 13.9% | | Visible (Tv/D65) | | 13.9% | Pass |
| UVB (290-315nm) | <0.125Tv | 0.0% | | UVB (280-315nm) | < 0.1 Tv | 0.0% | Pass |
| UVA (315-380nm) | <0.500Tv | 0.0% | | UVB (315-350nm) | < 0.5 Tv | 0.0% | Pass |
| | | | | UVA (315-380nm) | < 0.5 Tv | 0.0% | Pass |
| Traffic Signals | | | | Tmin (500-650nm) | > 0.2 Tv | 5.2% | |
| —Tsig | | | 17.5% Pass | Blue light (Tsb) | | 12.8% | |
| Red | >= 8% | | 13.1% Pass | Traffic Signals | | | |
| Yellow | >= 6% | | 14.8% Pass | Red | > 0.8 | 1.1 | Pass |
| Green | >= 6% | | | Yellow | > 0.8 | 0.9 | Pass |
| —Color Limit | x | y | | Green | > 0.6 | 1.1 | Pass |
| D65 | 0.30 | 0.34 | pass | Blue | > 0.4 | 1.1 | Pass |
| Yellow | 0.58 | 0.42 | pass | | | | |
| Green | 0.20 | 0.42 | pass | Polarizing ratio | > 8.0 | N/A | Pass |

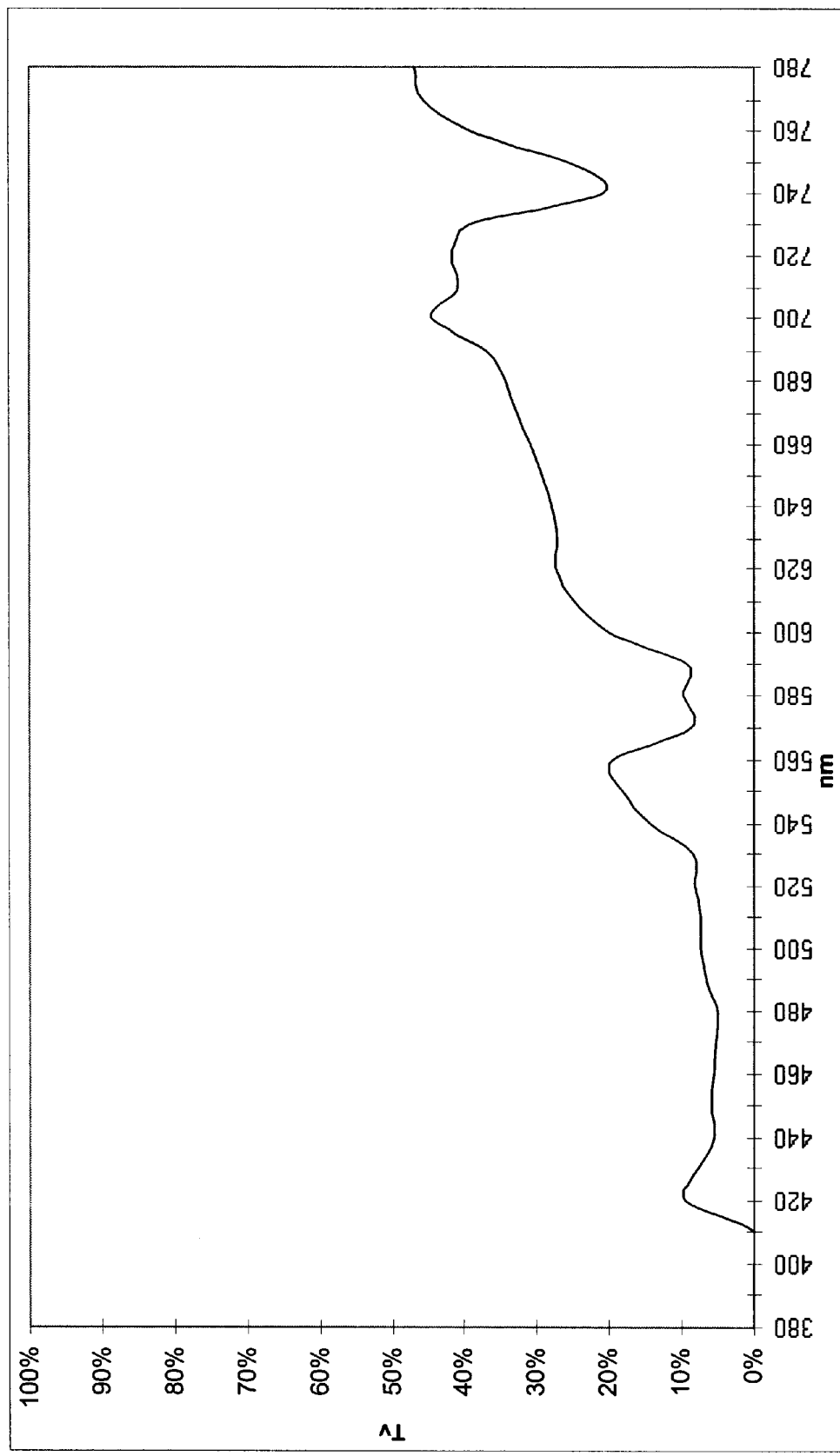
Fig. 20 Copper Lens

Fig. 21 Copper Lens Color and UV Performance

| Standard | ANSI Z80.3:1996 | | | Standard | EN 1836:1997 | | |
|---|---|---|---|---|---|---|---|
| Primary function: | General Purpose | | | Filter category: | 3 (Dark tint) | | |
| | Standard | Reading | Result | | Standard | Reading | Result |
| Luminous (Tv/C) | | 14.0% | | Visible (Tv/D65) | | 13.9% | Pass |
| UVB (290-315nm) | <0.125Tv | 0.0% | Pass | UVB (280-315nm) | < 0.1 Tv | 0.0% | Pass |
| UVA (315-380nm) | <0.500Tv | 0.0% | Pass | UVB (315-350nm) | < 0.5 Tv | 0.0% | Pass |
| | | | | UVA (315-380nm) | < 0.5 Tv | 0.0% | Pass |
| | | | | Tmin (500-650nm) (Tsb) | > 0.2 Tv | 7.4% | Pass |
| Traffic Signals | | | | Blue light | | 6.0% | |
| --Tsig | | | | Traffic Signals | | | |
| Red | >= 8% | 28.6% | Pass | Red | > 0.8 | 1.8 | Pass |
| Yellow | >= 6% | 17.9% | Pass | Yellow | > 0.8 | 1.3 | Pass |
| Green | >= 6% | 11.6% | Pass | Green | > 0.6 | 0.8 | Pass |
| --Color Limit | x | y | | Blue | > 0.4 | 0.8 | Pass |
| D65 | 0.43 | 0.39 | pass | | | | |
| Yellow | 0.61 | 0.39 | pass | | | | |
| Green | 0.26 | 0.49 | pass | Polarizing ratio | > 8.0 | N/A | Pass |

Fig. 22 Spectral Points for Lenses and Lens Components

| nm | Gray Film | Copper Film | Copper Lens | Gray Lens | Nd Oxide First Wafer | Second UV Wafer | nm |
|---|---|---|---|---|---|---|---|
| 380 | 36.07% | 32.58% | 0.00% | 0.00% | 85.59% | 0.16% | 380 |
| 390 | 38.52% | 30.85% | 0.00% | 0.00% | 87.25% | 0.16% | 390 |
| 400 | 40.25% | 29.00% | 0.01% | 0.00% | 87.83% | 0.18% | 400 |
| 410 | 42.31% | 28.70% | 0.05% | 0.01% | 87.93% | 9.64% | 410 |
| 420 | 41.62% | 27.12% | 9.51% | 13.65% | 87.48% | 77.17% | 420 |
| 430 | 40.64% | 26.39% | 7.67% | 14.78% | 77.26% | 88.00% | 430 |
| 440 | 40.15% | 26.93% | 5.43% | 12.65% | 67.79% | 88.91% | 440 |
| 450 | 39.51% | 27.91% | 5.68% | 13.84% | 74.93% | 89.56% | 450 |
| 460 | 38.68% | 28.77% | 5.66% | 14.00% | 75.98% | 90.09% | 460 |
| 470 | 37.80% | 29.55% | 5.18% | 12.83% | 72.12% | 90.46% | 470 |
| 480 | 37.66% | 30.45% | 4.90% | 11.89% | 71.85% | 90.87% | 480 |
| 490 | 36.50% | 28.05% | 6.66% | 14.93% | 86.07% | 91.09% | 490 |
| 500 | 33.95% | 24.06% | 7.45% | 15.28% | 86.76% | 91.24% | 500 |
| 510 | 30.35% | 21.33% | 7.39% | 13.85% | 78.60% | 91.36% | 510 |
| 520 | 29.07% | 16.76% | 8.21% | 14.11% | 75.98% | 91.40% | 520 |
| 530 | 31.66% | 10.97% | 8.36% | 12.43% | 68.80% | 91.47% | 530 |
| 540 | 34.69% | 10.17% | 14.32% | 18.60% | 86.90% | 91.49% | 540 |
| 550 | 36.52% | 19.91% | 18.26% | 20.73% | 92.10% | 91.43% | 550 |
| 560 | 37.13% | 32.02% | 19.59% | 19.97% | 89.53% | 91.44% | 560 |
| 570 | 37.17% | 37.14% | 8.77% | 7.23% | 42.05% | 91.49% | 570 |
| 580 | 37.00% | 38.59% | 9.86% | 6.43% | 28.35% | 91.50% | 580 |
| 590 | 36.36% | 38.45% | 9.24% | 5.17% | 31.87% | 91.32% | 590 |
| 600 | 36.54% | 38.75% | 20.03% | 11.47% | 67.36% | 91.15% | 600 |
| 610 | 36.39% | 38.62% | 24.69% | 14.64% | 85.05% | 90.99% | 610 |
| 620 | 36.39% | 38.65% | 27.35% | 16.05% | 93.34% | 90.79% | 620 |
| 630 | 36.31% | 38.53% | 27.19% | 15.08% | 93.60% | 90.56% | 630 |
| 640 | 36.35% | 38.55% | 27.99% | 15.34% | 94.50% | 90.36% | 640 |
| 650 | 36.47% | 38.59% | 29.23% | 17.76% | 94.83% | 90.34% | 650 |
| 660 | 36.68% | 38.69% | 30.97% | 22.14% | 94.71% | 90.21% | 660 |
| 670 | 37.11% | 39.12% | 32.62% | 26.04% | 93.33% | 89.91% | 670 |
| 680 | 37.33% | 39.37% | 34.34% | 28.58% | 90.62% | 89.65% | 680 |
| 690 | 37.57% | 39.53% | 37.05% | 31.03% | 91.22% | 89.47% | 690 |
| 700 | 37.94% | 39.97% | 44.72% | 33.58% | 94.06% | 89.32% | 700 |
| 710 | 38.43% | 40.57% | 40.97% | 34.89% | 94.40% | 89.22% | 710 |
| 720 | 38.90% | 41.29% | 41.57% | 35.65% | 93.40% | 89.07% | 720 |
| 730 | 39.31% | 42.16% | 39.33% | 33.41% | 82.75% | 88.94% | 730 |
| 740 | 39.55% | 43.00% | 20.94% | 16.67% | 48.63% | 88.78% | 740 |
| 750 | 35.17% | 39.90% | 25.55% | 20.26% | 54.29% | 88.75% | 750 |
| 760 | 39.68% | 45.43% | 39.40% | 32.34% | 77.00% | 88.79% | 760 |
| 770 | 41.75% | 48.83% | 45.62% | 37.76% | 87.61% | 88.70% | 770 |
| 780 | 44.54% | 52.91% | 46.96% | 38.17% | 86.30% | 88.58% | 780 |

| | Gray Film | Copper Film | Copper Lens | Gray Lens | Nd Oxide First Wafer | Second UV Wafer |
|---|---|---|---|---|---|---|
| Luminous Tranmission as specified by ANSI Z80.3 1996 | | | 14.0% | 13.9% | | |
| 20% of Luminous Transmission | 0.0% | 0.0% | 2.8% | 2.8% | 0.0% | 0.0% |
| Lowest Spectral Points | | | 7.39% | 5.17% | | |

POLARIZED LENS WITH OXIDE ADDITIVE

This application is a continuation-in-part of U.S. application Ser. No. 09/255,093 filed Feb. 22, 1999 now U.S. Pat. No. 6,334,680 which is related to U.S. Provisional Application Ser. No. 60/075,577 filed Feb. 23, 1998, the disclosures of which are hereby incorporated by reference.

FIELD OF THE INVENTION

This invention relates to lenses and more particularly to lenses incorporating polarizing films or coatings and processes of making such lenses utilizing oxide additives that have distinct transmission and absorption qualities.

BACKGROUND OF THE INVENTION

One challenge faced by lens manufacturers concerns glare. The term glare refers to the presence of one or more areas in the field of vision that are of sufficient brightness to cause an unpleasant sensation, a temporary blurring of vision, or a feeling of ocular fatigue. Glare occurs when patches of bright light are reflected from smooth, shiny surfaces into the eye. Typical reflecting surfaces include water, snow, roadways and glass. Reflections are not only annoying but interfere with vision, at times seriously.

It takes more than regular sunglasses to protect a person from the discomfort glare. If a hot spot in the visual field is ten times as bright as the background illumination, the use of a filter with 50% transmittance is of little help in the visual field, because both the hot spot and the background are reduced by the same percentage. However, light-polarizing lenses are useful in controlling glare because they filter only polarized light, and directly-reflected sunlight is polarized, while ambient lighting is not.

Another challenge faced by lens manufacturers concerns light reflecting off the lens itself. When light reaches the boundary between two transparent media having different indices of refraction, most light is refracted, but a small amount is reflected. Reflected light may be troublesome because it can produce ghost images, falsification of image position, haze and loss of contrast of images being viewed through a lens. Reflected light can reduce transmission up to 12% on certain lens materials.

Applying an anti-reflection (AR) coating on the front and back surface of a lens can increase the transmittance of light to over 99%. Unfortunately, anti-reflective coatings are relatively soft and tend to scratch easily. In addition, they tend to display greasy marks and smudges and require frequent and careful cleanings. The more effective the AR coating (greater transmission), the greater the chance that lens surface imperfections will be seen.

To increase the hardness of a coating and to make marks less noticeable and the surface easier to clean, hydrophobic coatings are applied. A hydrophobic coating is a special layer (usually silicon) placed on top of an anti-reflective coating. The hydrophobic coating is a smooth, flexible layer, which fills in the pores in the surface of the anti-reflective layers. This final hydrophobic layer creates a hard slick surface giving the lens greater scratch resistance, water-repellant features, and easier cleaning capabilities.

A third and even more complex challenge faced by designers of sunglasses is to maintain the wearer's ability to distinguish objects based on color.

Radiation is a physical term defining the transfer of energy through space, from an emitter or radiator to a receiver. When light is emitted by a source and is subsequently absorbed by a receptor, a net transfer of energy occurs. The sun is a radiator, producing energy that radiates through space in all directions. The sun's radiation is called electromagnetic radiation because it consists of an oscillatory electric field and of an oscillatory magnetic field that are perpendicular to one another and to the direction of propagation of the radiation. This radiation consists of minute particles called photons. The distance of measurement between one oscillation of one photon is called a nanometer (nm). A single photon can differ from another photon in only one respect: its energy. A high value of this nm measurement denotes considerable sluggishness and so implies a low frequency of oscillation and a low energy. A photon of shorter wavelength oscillates more frequently and carries more energy. And to these differences in energy our eyes respond, enabling us to see colors. High-energy light, in which most of the photons have wavelengths of around 400 nm looks blue or violet, while low-energy light, containing photons mainly of wavelengths around 700 nm, looks red. The light that is sensitive to humans lies within the visible spectrum. The visible spectrum consists of several colors that have different levels of energy. This is illustrated in FIG. 1 of the drawings, which shows the electromagnetic spectrum.

The following Table 1 shows the correspondence between energy levels and human color sensation.

TABLE 1

| Color Sensation | Wavelength (nm) |
| --- | --- |
| Violet | 380 to 424 |
| Blue | 424 to 491 |
| Green | 491 to 575 |
| Yellow | 575 to 585 |
| Orange | 585 to 647 |
| Red | 647 to 760 |

Studies conducted in connection with the manufacture of artificial lighting have found that human color vision may be characterized chromatically by three channels. Chromatic response falls nearly to zero in the blue-green near 500 nm and in the yellow near 580 nm, as well as in violet beyond 400 nm and in the deep red beyond 700 nm. The minima may be related to the fact that the red-green-blind protanope sees no hue at all near 500 nm and the tritanope sees no hue near 580 nm. These wavelengths impair proper identification of chromaticities of colored objects.

The eye uses wavelengths near 450, 540, and 610 nm most effectively, and in a sense samples, at these wavelengths, all incoming light. Color discrimination can be improved by elimination of wavelengths near 500 and 580 nm,[1] increasing color discrimination per watt input at the eye.[2]

[1] Journal of the Optical Society of America, Volume 62, Number 3, Pages 457 through 459.
[2] Journal of the Optical Society of America, Volume 61, Number 9, Pages 1155 through 1163.

Another challenge to lens manufacturers is presented in environments where the lens users require good color discrimination be maintained even though they experience wide variations in light and glare intensities. For example, operators of motor vehicles often must follow directions provided by traffic signals or other color-coded safety and control devices in bright sunlight and low light conditions caused by weather and/or time of day. Darker tinted lenses obviously ease wearer discomfort in bright light conditions. Inclusion of ultraviolet light absorbers also assists in preventing damage to the eye of the wearer. However, providing a darker lens in terms of light transmitted to the user can prove problematic. For example safety concerns can arise if such transmission interferes with the use of narrow band (LED) light sources and the ability of the lens user to discriminate between, such as red, yellow and green traffic lights. This concern has caused the American National Standard Institute, Inc. and other regulatory boards and agencies (ISO, CEN Ophthalmic Standards) to adopt a requirement that no spectral point of a lens shall be less than 20% of the luminescent transmittance of the lens between 500 and 650 nm.

SUMMARY OF THE INVENTION

According to the invention, a lens system is provided having two or more lens wafers including an oxide additive resulting in a lens providing improved visual enhancement while maintaining every spectral point between 500 and 650 nm has a transmittency that is greater than about 20% or more of the luminous transmission of the lens.. Including an ultraviolet absorber in a lens having such properties along with a polarizing filter and anti-reflective coatings can result in a particularly useful lens.

BRIEF DESCRIPTION OF THE DRAWINGS

FIG. 1 is a diagram of the electromagnetic spectrum.

FIG. 2 is a diagram showing light wave motion on a plurality of planes.

FIG. 3 is a partially schematic, sectional view of a film made from polyvinyl alcohol, the film being stretched in the directions indicated by the two arrows.

FIG. 14 is the spectral characteristics of a first glass lens wafer containing a neodymium oxide component.

FIG. 15 is the spectral characteristics of a gray film portion according to the present invention.

FIG. 16 is the spectral characteristics of a copper film portion according to the present invention.

FIG. 17 is the spectral characteristics of a second glass wafer according to the present invention containing a ultra-violet absorber component.

FIG. 18 is the spectral characteristics of a gray lens system according to the present invention including the components of FIGS. 14, 15 and 17.

FIG. 19 is the color and ultra-violet performance of the lens system of FIG. 18.

FIG. 20 is the spectral characteristics of a lens system according to the present invention including the components of FIGS. 14, 16 and 17.

FIG. 21 is the color and ultra-violet performance of the lens system of FIG. 20.

FIG. 22 is a comparison of the spectral characteristics of lenses and lens components according to the present invention including the luminescent transmission of the lenses.

DETAILED DESCRIPTION OF PREFERRED EMBODIMENTS

According to the invention, a lens or pair of lenses is provided which may be incorporated into items such as eyeglasses, cameras, binoculars, scopes, or any other instrument designed for viewing that utilizes a lens. A lens according to the invention may improve a person's vision by reducing obtrusive glare and increasing color discrimination.

As seen in FIG. 1, one example of a s lens 10 in accordance with the invention includes a polarized filter 12 to eliminate glare. Glare is primarily caused by reflected light emanating from the sun. Because such light is polarized, use of a polarizing filter within or on the lens can reduce the visually obstructing effects of glare.

Figure 4:
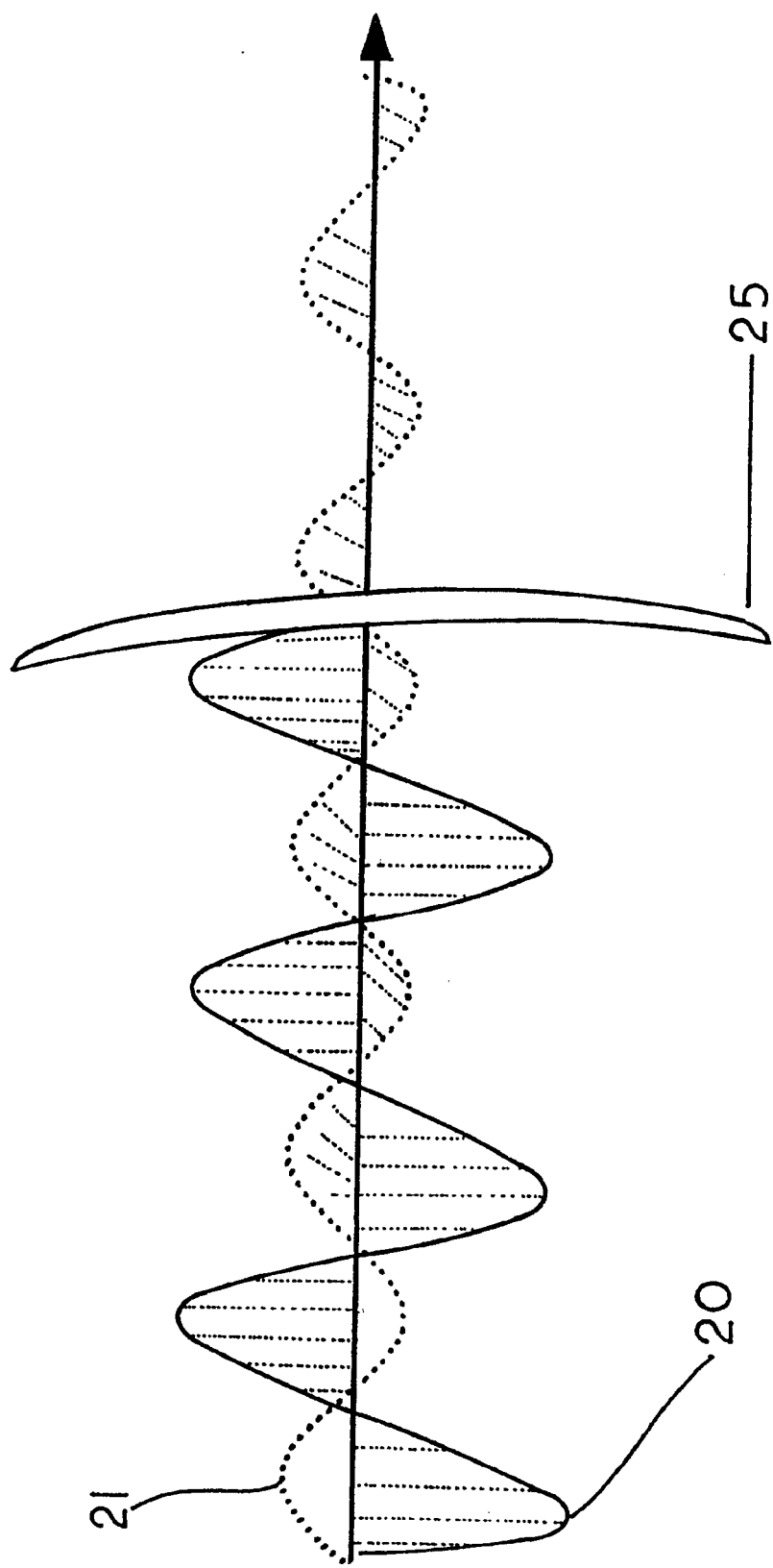
FIG. 4 is a schematic illustration of a wave motion of light showing two light waves, one at the right angle to the other, one wave being polarized and absorbed by a polarized lens.

Human vision does not distinguish between polarized and non-polarized light. However, polarized films can absorb certain orientations of polarized light. FIG. 4 shows two light waves 20, 21 at right angles to each other, one of them (20) being a polarized light wave. A lens 25 has a polarized film that absorbs light oscillations in one direction, but not the component oriented at right angles. The aligned particles of the film transmit one plane of polarized light and absorb the perpendicular polarized light. As a result, the polarized film effectively reduces, and in many cases eliminates, the vision disturbance created by glare.

With reference to FIG. 3, a film used as the polarized filter 12 is typically made from a sheet of polyvinyl alcohol, which is heated and stretched in a given direction (shown the with arrows) with the long hydrocarbon molecules of the polyvinyl alcohol becoming aligned during the stretching process.

The sheet shown in FIG. 3 is then dipped into an ink solution rich in iodine. The iodine impregnates the plastic sheet and attaches to the straight long-chain polymeric molecules, effectively forming a chain of its own., The longer the film remains in the iodine solution, the greater amount of iodine that impregnates the film, making the film darker and reducing the transmission of light. Various colors of the iodine solution may be used to produce different colors of film that have noticeably different effects and uses. Amber-colored films have a tendency to reduce the amount of light transmission in the blue area of the spectrum, whereas neutral-colored films do not reduce the blue area of the spectrum, whereas neutral-colored films do not reduce the blue area of the spectrum. Dark-colored films are best to be used in the lenses designed to be worn in bright sunlight, whereas lighter-colored films are best used as photography filters. Typically, the film is approximately 30 microns in thickness. In order to protect the surface and shape of this polarizing film, it can be incorporated into the interior of a lens. The surrounding lens material, which can be made of glass or plastic, then protects the film.

Figure 10:
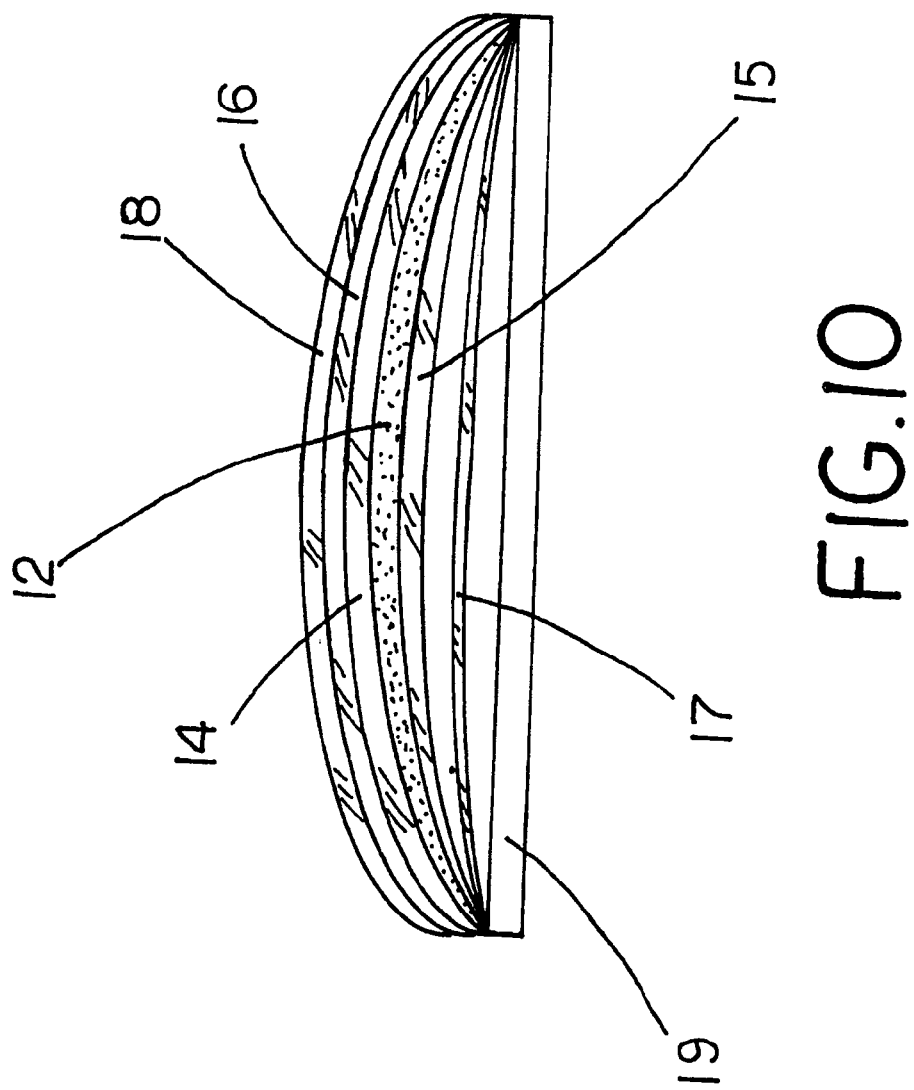
FIG. 10 is a schematic view of a second embodiment of a lens according to the invention.

The lens 10 of FIG. 10 also includes an absorptive lens wafer 14. An absorptive lens is one that reduces the amount of transmitted light or radiant energy; thus, it acts as a filter. Absorption may be uniform, absorbing visible light of all wavelengths, or selective, absorbing some wavelengths more than others. Absorptive lenses are sometimes referred to as tinted or colored lenses because they are not usually clear and colorless, as are lenses made of white ophthalmic crown glass.

The most common forms of absorptive lenses produced by lens manufacturers today are (1) tinted solid glass lenses, (2) glass lenses with surface coatings, (3) tinted solid plastic lenses, (4) photochromic lenses, and (5) polarizing lenses. This invention incorporates different manufacturing techniques to produce a unique lens with unusual absorption characteristics.

Figure 5:
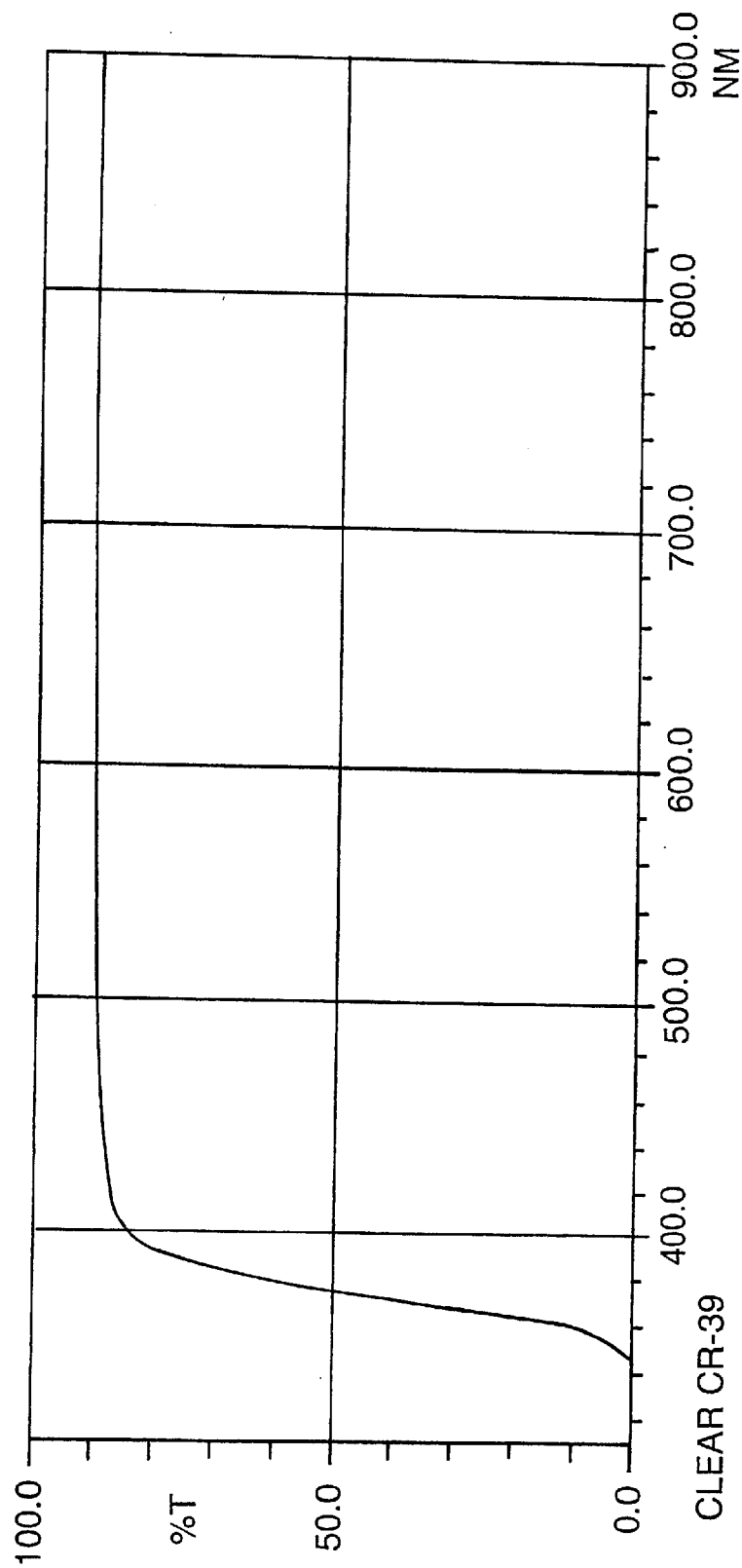
FIG. 5 is a graph showing the spectral transmission of a 2.0 nm thick clear glass wafer (%T vs. nm).

The principal ingredients of white ophthalmic crown glass are silica, soda, and lime, to which small amounts of potassium, aluminum, and barium oxides are typically added to provide the desired physical and chemical properties. FIG. 5 illustrates the spectral transmission of a typical clear glass lens. To produce a tinted lens, one or more metals or metallic oxides are introduced into the basic batch at the start of the manufacturing process. The spectral transmission characteristics of the finished lenses are controlled by the quantities of these metal oxides present at the initial batch stage. The concentration of metals and metallic oxides incorporated to produce colors in lenses is less than 1%, even for dense colors.

The color imparted by the addition of an absorptive substance is of no particular significance: it is merely an incidental by-product. The color of the lens does not indicate the specific absorptive characteristics of the lens in the UV or IR regions. The apparent color of the lens depends on those portions of the visible spectrum that are transmitted. If the lens transmits more of the green portion of the visible spectrum than it does of the blue, the lens appears to be green by the transmitted light. This apparent color is useful for determining the general effect on the visible portion of the spectrum. If the transmission is uniform across the visible spectrum, the lens appears to be neutral gray, and any colors viewed through it are not appreciably changed. However, the overall brightness of the scene appears to decrease. If the transmission over the visible spectrum is not uniform, but selective, the lens appears to have a distinct color, and the color of any object viewed through the lens may be altered.

The lens wafer 14 in FIG. 10 is preferably constructed of mineral glass, but could also be made of an organic material such as plastic, resin, or polycarbonate, and includes an oxide that improves color discrimination by transmitting a relatively large percentage of light at specific wavelengths that are most easily distinguished by the brain, and by absorbing as much light as possible at specific wavelengths that are the less easily distinguished by the brain, and thus transmitting a relatively low percentage of light at those wavelengths. As illustrated, the lens wafer 14 includes neodymium (Nd). Adding neodymium to the basic batch in the initial process for producing a glass lens of the inventions results in the spectral transmission that is relatively high in the 450, 540 and 610 nm ranges, the three primary channels for increased chromatic response. Neodymium also absorbs nearly all light in the 580 nm range, one of the least effective channels for chromatic response.

Figure 6:
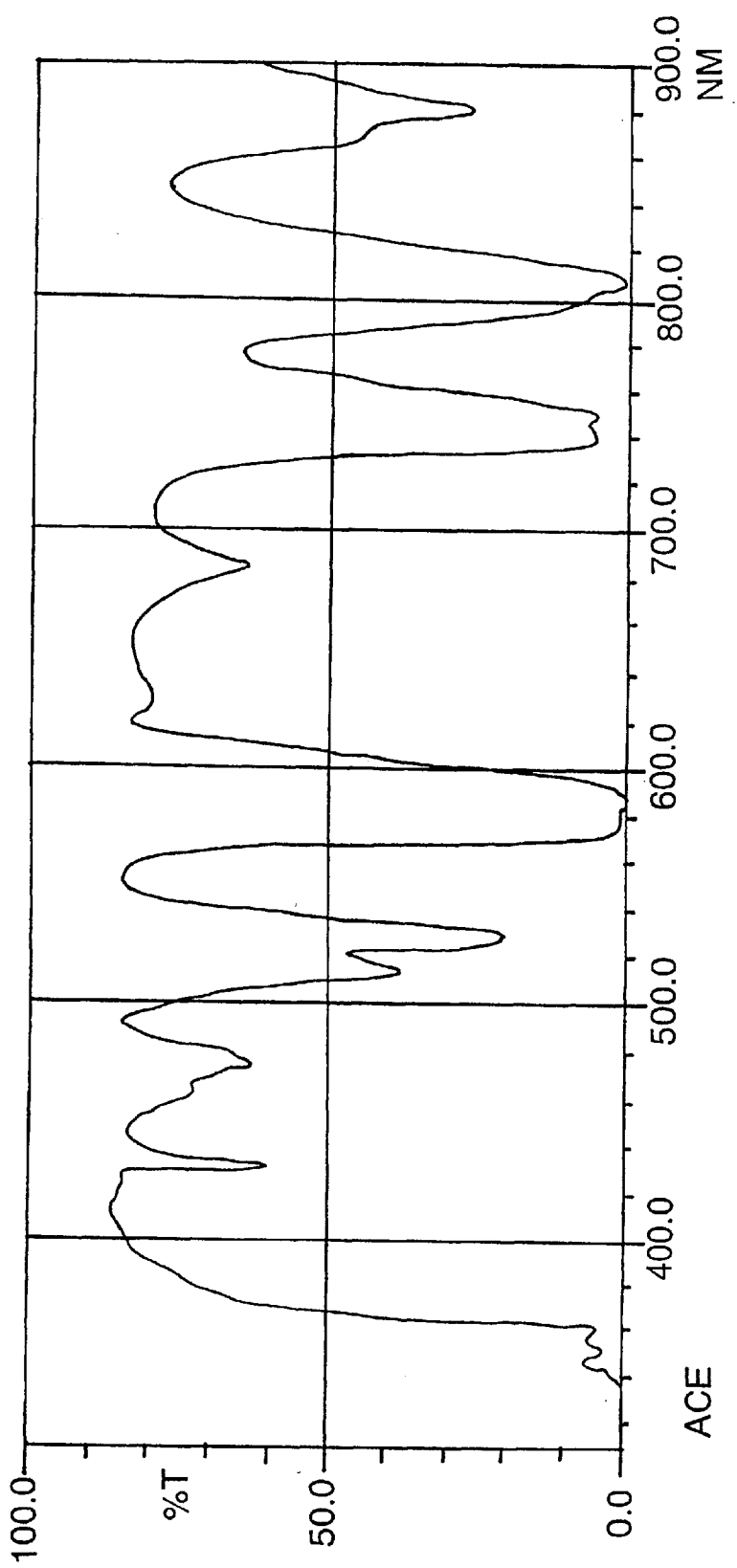
FIG. 6 is a graph showing the spectral transmission of a 1.8 mm thick glass wafer according to the invention (%T vs. nm).
Figure 7:
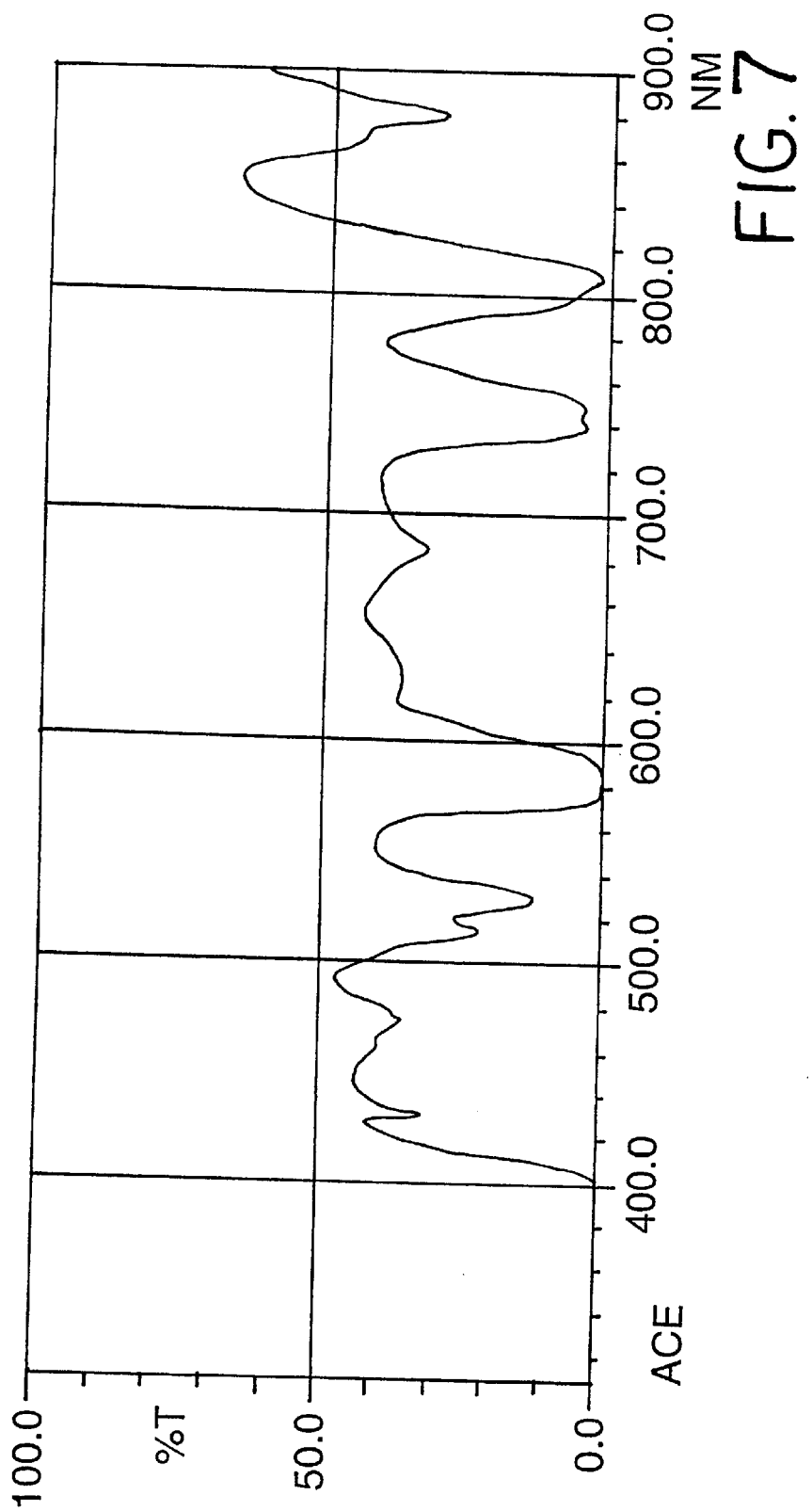
FIG. 7 is a graph showing the spectral transmission of a glass wafer according to the invention, including a light gray polarized film (%T vs. nm).
Figure 8:
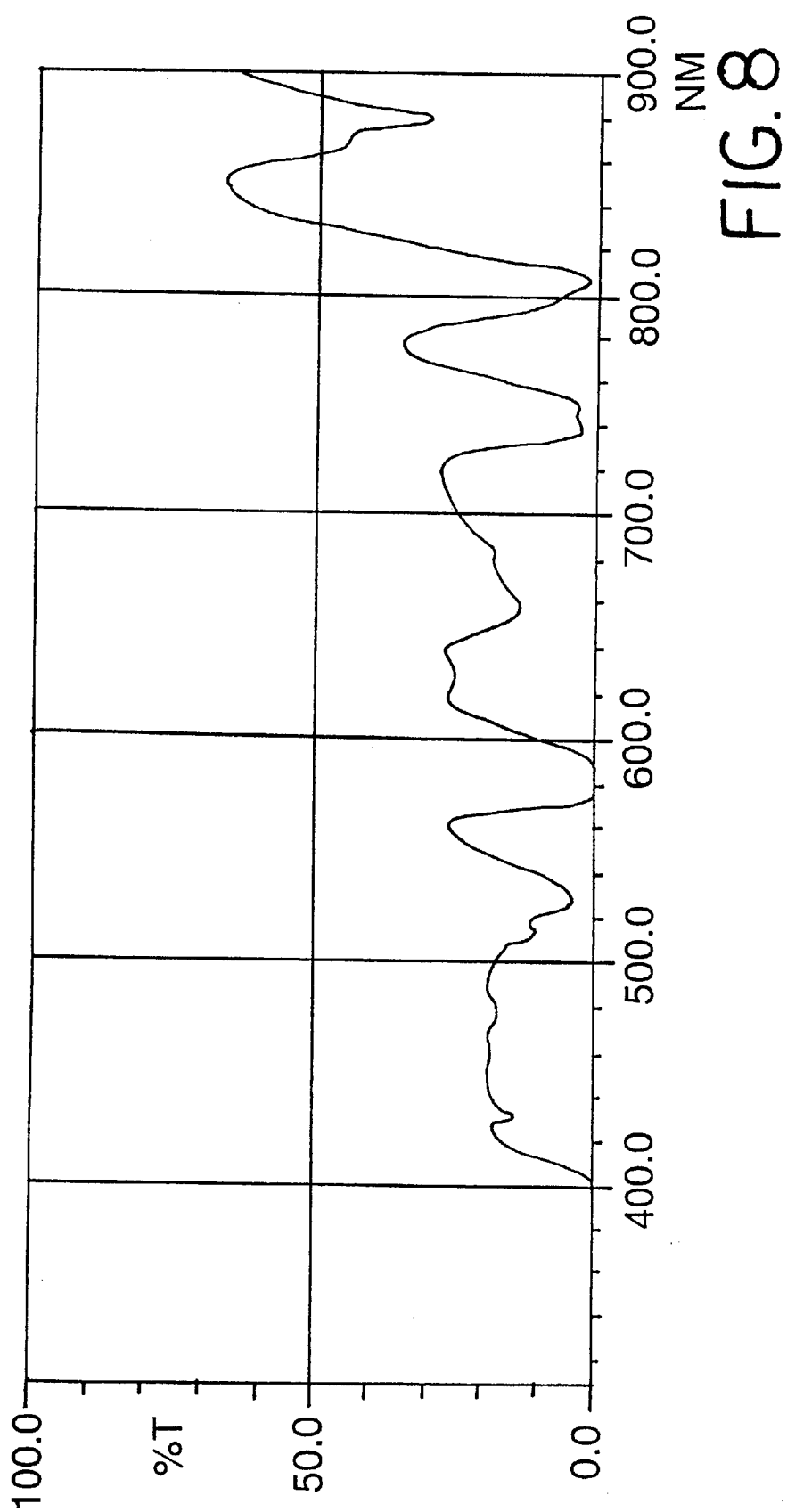
FIG. 8 is a graph showing the spectral transmission of a glass wafer according to the invention, including a brown polarized film (%T vs. nm).

FIG. 6 records the spectral transmission of a 1.8 mm glass wafer in which neodymium has been added. Light transmittency at 450 nm, 540 nm, and 610 nm is relatively high compared to transmittency at 500 nm and 580 nm, which is relatively low. FIG. 7 illustrates the spectral transmission of such a neodymium wafer combined with a light gray polarized film. FIG. 8 illustrates the spectral transmission of such a neodymium wafer combined with a brown polarized film.

The lens 10 of FIG. 10 was prepared using the WeatherEyes™ coating process, with an anti-reflection layer 16 on the front surface of the lens sealed with a hydrophobic protective layer 18. Specifically, the lens includes the following adjacent materials:

1) the optional front hydrophobic top layer 18;
2) the optional front anti-reflection layer 16;
3) the front lens wafer 14 containing neodymium;
4) the polarized filter 12;
5) an optional back lens wafer 15 containing neodymium;
6) an optional back anti-reflection layer 17; and
7) an optional hydrophobic back top layer 19.

Figure 9:
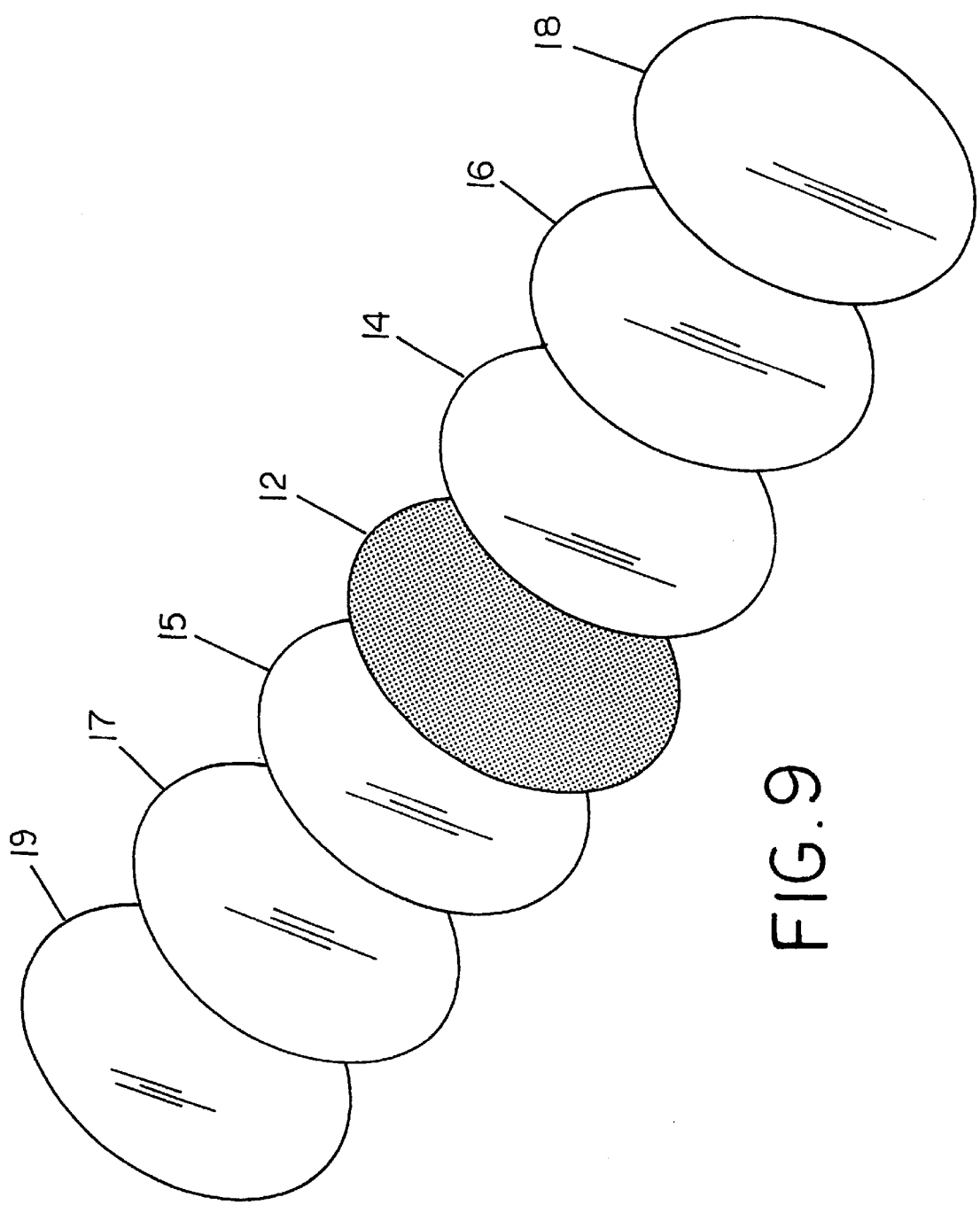
FIG. 9 is a partially schematic and expanded view of a lens according to the invention.

FIG. 9 illustrates a combination of wafers making up a lens that includes hydrophobic protective layers 18 and 19, anti-reflection layers 16 and 17, a polarized filter 12, and two lens wafers 14 and 15 containing neodymium.

Using a neodymium-laced wafer as one or both of the wafers 14, 15 encasing the polarized filter 12 produces a unique lens, altering the original hue of the polarized filter 12 and the neodymium-laced wafers. The lens controls glare by filtering out polarized reflected light, and enhances color discrimination by selectively transmitting and absorbing different parts of the visible spectrum.

Alternatively, neodymium may be included in a coating or a film which may be placed or coated on a glass wafer, or in the polarized film layer, A lens according to the invention may be made from a molded plastic lens material that includes both a polarized film and an oxide. For example, a plastic polarized lens, such as a polycarbonate polarized lens, may be made by positioning a polarized film within a mold while plastic material is injected around the film, thus encapsulating and protecting the polarized film. An appropriate oxide may be in the polarized film or in the plastic material.

After the lens is produced, it preferably is coated with one or more AR coatings to prevent the reflection of light from the surface of the lens. Before the coatings are applied, the lens should be prepared by careful cleaning and then baked for at least two hours to remove water vapor and volatile organic compounds. The coating process may then be carried out in a vacuum environment with the use of an electron beam evaporation source and micro-processor-controlled monitoring techniques.

Figure 11:
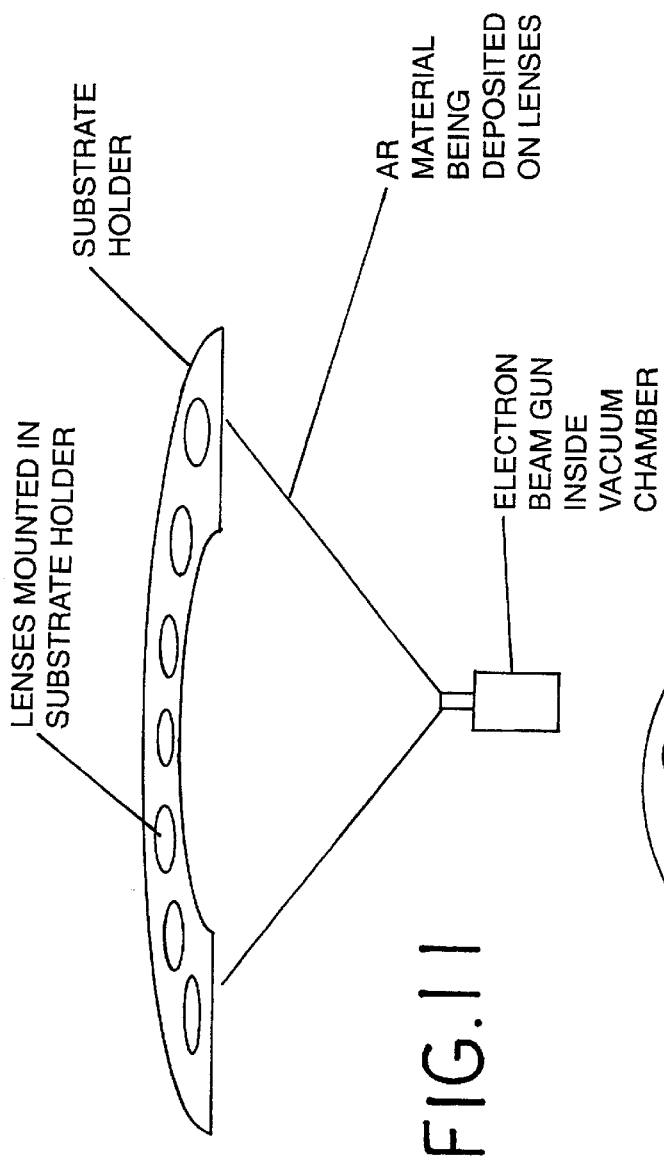
FIG. 11 is a schematic side view of a lens coating mechanism in a vacuum chamber.
Figure 12:
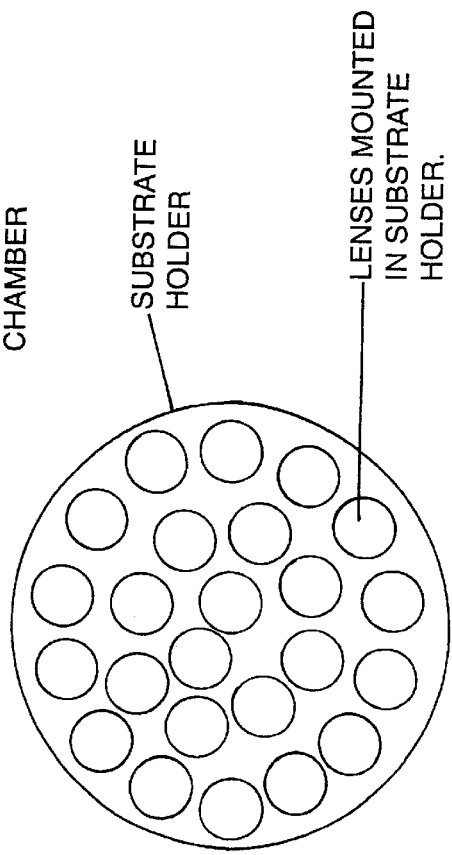
FIG. 12 is a top plan view of the mechanism shown in FIG. 11.

FIGS. 11 and 12 illustrate how a coating is applied to a lens inside a vacuum chamber. A set of lenses 40 are placed on a rack 42 (called the substrate holder) and put into position to receive the evaporated material. The preferred material used for deposition onto the lens is magnesium hexafluoride. A single, thin coating placed directly on the lens surface is seldom hard and durable enough to withstand the severe conditions ophthalmic lenses usually encounter. Accordingly, it may be preferable to deposit multiple layers of magnesium hexafluoride on each outside surface of the lenses. As illustrated, five layers have been applied. After the layers of AR material are deposited, an additional layer of a hydrophobic material may be evaporated on top of the AR material. The hydrophobic material protects the AR material and makes it easier to clean by making the surface very slick and water repellent.

Figure 13:
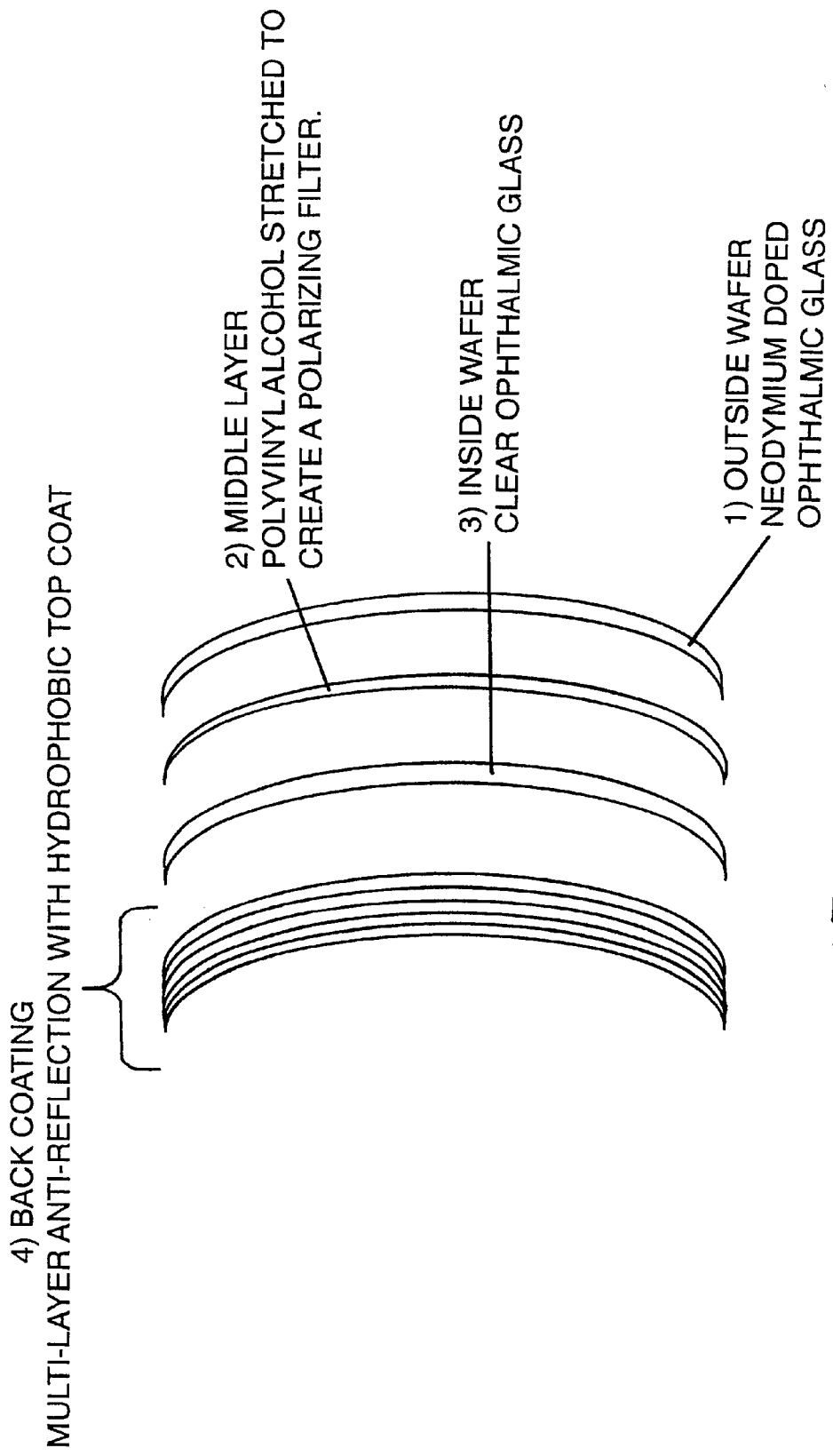
FIG. 13 is a partially schematic and expanded view of a third embodiment of a lens according to the invention.

FIG. 13 illustrates an alternative embodiment of a lens 10 according to the invention. The outside front wafer 14 of the lens 10 is made of ophthalmic glass with a composition that usually consists of silicon, arsenic, boron, sodium, zinc, lithium, potassium, aluminum, phosphorous, magnesium, calcium, barium, and strontium. Neodymium has been added to this composition. Neodymium preferably does not exceed a mole percentage of 10. The lens is ground and polished to an approximate thickness of 1.2 mm. As illustrated, the curvatures of the convex and the concave side of this front glass wafer are equal to each other.

A middle, polarized film layer 12 of the lens 10 is made of polyvinyl alcohol, which has been stretched in a given direction, causing its long hydrocarbon molecules to become aligned in the process. The stretched sheet is then dipped into an ink solution rich in iodine. The iodine impregnates the plastic and attaches to the straight long-cabin polymeric molecules, effectively forming a chain of its own. The stretched polyvinyl alcohol is glued to the concave surface of the front wafer. One sample of this material was dyed with gray iodine (see FIG. 7 for spectral transmission), while a second sample of this material was dyed with brown iodine (see FIG. 8 for spectral transmission).

The inside back wafer 15 is ophthalmic glass with a composition that usually consists of silicon, arsenic, boron, sodium, zinc, lithium, potassium, aluminum, phosphorous, magnesium, calcium, barium and strontium. This lens wafer is ground and polished with the convex curvature to be the same as that on the concave surface of the outside front wafer 14. The back wafer 15 can be ground to various thicknesses. It preferably is ground to an approximate thickness of about 1.0 mm to about 1.2 mm for the use of the non-prescription lenses. A back wafer or blank whose thickness exceeds 2.0 mm can have special curve ground for prescription use. The non-prescription wafer or the thicker blank to be used for prescription grinding is then glued to the concave side of the middle layer 12 which has been glued to the front wafer 14.

As light transmits initially through the front glass wafer containing the neodymium, it is selectively absorbed and transmitted. The selective transmittance increases a person's color discrimination and visual enhancement. When the remaining light is transmitted through the polyvinyl alcohol, a portion of the polarized light becomes absorbed, reducing the visually disturbing glare from the visual field.

Lenses according to the invention transmit light to the lens with minimal reflection. The transmitted light is selectively absorbed to improve a person's color discrimination and filtered to eliminate obtrusive glare.

Alternatively, lenses according to the present invention may comprise a first lens wafer containing from about 1 to about 1.8% (by mole) neodymium, and preferably from about 1 to about 1.6% by mole neodymium. Such lens can also contain a polymerizing filter layer having a luminous transmission from about 15% to about 50% located between the first wafer and a second lens wafer containing a suitable amount of an ultra-violet absorber. Such lens components may be obtained from Japan Eyewear Corporation, Fukui, Japan, Corning Corporation, Corning, N.Y. and Schott Glass Corporation, Yonkers, N.Y.

By careful selection of such lens components, including lens wafer systems containing the above-described amount of neodymium, dyes and ultra-violet absorbers, applicant has discovery lens systems that possess excellent spectral transmission characteristics and color characteristics and ultra-violet absorption while passing the 20% luminescent transmission standard imposed by ANSI 4.6.3.3.

For example, and as shown in FIG. 14, the lens according to the present invention may comprise a first glass lens wafer containing about 1.4 to about 1.5% by mole neodymium thereby providing the spectral transmittance characteristics shown in the FIGS. 18 and 20. That spectra was obtained by use of a Hewlett Packard 8450A Spectrophotometer according to the manufacturer's instruction. The oxide wafer was 70 mm in diameter, with a 1.0 mm thickness and a 6 Base curvature. The wafer's spherical power was about 0.03D and its astigmatic power was a maximum of 0.03D. The wafer has a prismatic power of a maximum of about 0.12Δ.

The spectral characteristics of the gray and copper films that may be employed according to preferred embodiments according to the present invention are shown in FIGS. 15 and 16, respectively as determined by use of a Hitachi U-3000 Spectrophotometer according to the manufacturer's instructions. These films were obtained from Japan Eyewear Corporation, and exhibited polarization of about 99% or more. The films were applied by the manufacturer between the first lens wafer described above and a second glass lens wafer of a thickness of 1.24 mm and with the same diameter, curvature, spherical power, astigmatic and prismatic power as the first wafer, containing an ultra-violet absorber also supplied by the same manufacturer or Schott S-12 Clear Crown UV absorbing glass, but containing no neodymium. The spectral characteristics of the second lens wafer are shown in FIG. 17 and were determined by use of a Hewlett-Packard 8450A Spectrophotometer according to the manufacturer's instructions.

The overall spectral characteristics of gray and copper lenses according to the present invention containing the above-described first and second lens wafers and films are shown in FIGS. 18 and 20, respectively. Those spectra were obtained by use of a Cary 50 Spectrophotometer according to the manufacturer's instructions. The lenses also contain an anti-reflective coating applied to concave surface of the back lens wafer and a hydrophobic coating applied as the final layer on the convex surface of the front lens wafer and the concave surface of the second wafer. As shown therein and in FIG. 22, the lenses according to the present invention have relatively progressively higher transmittance at 540 nm than at 500 nm and at 500 nm relative to 450 nm, and an average transmittance at 540 and 610 nm that is greater than that at 580 nm. Moreover, the lenses pass the 20% standard required by ANSI Z80-3 1996, Section 4.6.3.3 as well as the traffic signal color standard ANSI Z80-3 1996 and International Standard EN 1836:1997 for UV absorption. (See FIGS. 19 and 21).

The foregoing examples are merely representative of lenses that could be provided according to the present invention. Other variations and modifications will occur to those of skill in these arts, and are within the scope of the appended claims. For example, and without limitation, lenses according to the present invention may include two or more lens wafers containing neodymium and/or ultra-violet absorbers. The order of the wafers in the lens system may also be varied. Use of multiple coatings or other inclusion of anti-reflective coatings and hydrophobic coatings may also be employed.

I claim:

1. A multi-layer lens for eyeglasses comprising:
   a lens wafer system comprising at least a first lens wafer and a second lens wafer;
   a polarizing layer between the first and second lens wafer; and
   an ultraviolet light absorbing component present in the lens wafer system;

wherein said lens wafer system comprises from about 1% to about 1.8% by mole neodymium and being adapted to impart light transmittance characteristics to the lens such that the lens will exhibit a light transmittance at 500 nm that is greater then its transmittance at 450 nm, a light transmittance at 540 nm that is greater than the transmittance at 500 nm, and an average light transmittance at 540 nm and 610 nm that is greater than a light transmittance at 580 nm, said lens being farther characterized by having all spectral points having a transmittance of about 20% or more between 500 nm and 650 nm as defined by ANSI Standard Z803-1996 Section 4.6.3.3.

2. A lens according to claim 1 wherein said lens wafer system comprises from about 1% to about 1.6% by mole neodymium.

3. A lens according to claim 1 wherein said lens wafer system comprises from about 1.4% to 1.5% by mole neodymium.

4. A lens according to claim 1 wherein said lens comprises a hydrophobic coating applied to at least one surface of at least one lens wafer.

5. A lens according to claim 1 wherein said neodymium is present in only the first lens wafer.

6. A lens according to claim 2 wherein said neodymium is present in only the first lens wafer.

7. A lens according to claim 1 wherein said lens comprises an anti-reflective coating applied to at least one outer surface of a lens wafer, and a hydrophobic coating applied to the anti-reflective coating.

8. A lens according to claim 1 wherein said lens comprises anti-reflective coatings applies to the outer surfaces of at least two of the lens wafers.

9. A lens according to claim 8 wherein said lens comprises a hydrophobic coating applied to at least one of the anti-reflective coatings present on the lens wafers.

10. A lens according to claim 1 wherein said polarizing layer has a luminous transmission of from about 15% to about 50%.

11. A multi-layer lens for eyeglasses comprising:

a lens wafer system comprising at least a first lens wafer and a second lens wafer;

a polarizing layer between the first and second lens wafer;

an ultraviolet light absorbing component present in the lens wafer system; and an anti-reflective layer adjacent to an outer surface of at least one of the lens wafers, wherein said lens wafer system comprises from about 1% to about 1.8% by mole neodymium and being adapted to impart light transmittance characteristics to the lens such that the lens will exhibit a light transmittance at 500 nm that is greater that its transmittance at 450 nm, a light transmittance at 540 nm that is greater than the transmittance at 500 nm, and an average light transmittance at 540 nm and 610 nm that is greater than a light transmittance at 580 nm, said lens being further characterized by having all spectral points having a transmittance of about 20% or more between 500 nm and 650 nm as defined by ANSI Standard Z803-1996 Section 4.6.3.3.

12. A lens according to claim 11 wherein said lens wafer system comprises from about 1% to about 1.6% by mole neodymium.

13. A lens according to claim 12 wherein said lens wafer system comprises from about 1.4% to about 1.5% by mole neodymium.

14. A lens according to claim 11 wherein said neodymium is present in only the first lens wafer.

15. A lens according to claim 12 wherein said neodymium is present in only the first lens wafer.

16. A lens according to claim 11 wherein said lens comprises a hydrophobic coating applied to at least one surface of at least one lens wafer.

17. A lens according to claim 11 wherein said lens comprises a hydrophobic coating applied to the anti-reflective coating.

18. A lens according to claim 11 wherein said lens comprises anti-reflective coatings applies to the outer surfaces of at least two of the lens wafers.

19. A lens according to claim 18 wherein said lens comprises a hydrophobic coating applied to the anti-reflective coatings present on the lens wafers.

20. A lens according to claim 11 wherein said polarizing layer has a luminous transmission of from about 15% to about 50%.

* * * * *